(12) United States Patent
Cheng et al.

(10) Patent No.: US 9,058,933 B2
(45) Date of Patent: Jun. 16, 2015

(54) DECOUPLING DEVICE INCLUDING A PLURALITY OF CAPACITOR UNIT ARRAYED IN A SAME PLANE

(71) Applicant: Industrial Technology Research Institute, Hsinchu (TW)

(72) Inventors: Cheng-Liang Cheng, Hsinchu (TW); Yi-Hsiu Pan, Nantou County (TW); Yu-Ting Cheng, Hsinchu (TW); Li-Duan Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/265,365

(22) Filed: Apr. 30, 2014

(65) Prior Publication Data

US 2014/0233158 A1    Aug. 21, 2014

Related U.S. Application Data

(63) Continuation of application No. 13/053,195, filed on Mar. 21, 2011, now Pat. No. 8,773,844.

(30) Foreign Application Priority Data

Dec. 28, 2010    (TW) .............................. 99146364 A

(51) Int. Cl.
*H01G 9/14* (2006.01)
*H01G 9/012* (2006.01)
(Continued)

(52) U.S. Cl.
CPC ................. *H01G 9/14* (2013.01); *H01G 9/012* (2013.01); *H01G 9/15* (2013.01); *H01G 9/04* (2013.01)

(58) Field of Classification Search
CPC ........... H01G 9/15; H01G 9/012; H01G 9/14; H01G 9/04

USPC ....................... 361/523, 540, 538, 301.4, 328
See application file for complete search history.

(56) References Cited

U.S. PATENT DOCUMENTS

| 4,470,099 A | 9/1984 | Sawairi |
| 4,675,790 A | 6/1987 | DeMatos et al. |

(Continued)

FOREIGN PATENT DOCUMENTS

| JP | 1989037006 | 2/1989 |
| JP | H0318826 | 1/1991 |

(Continued)

OTHER PUBLICATIONS

John Prymak et al., "Decoupling Solutions," Assemblies & Materials Association, Apr. 2007, pp. 1-10.

(Continued)

*Primary Examiner* — David M Sinclair
(74) *Attorney, Agent, or Firm* — Jianq Chyun IP Office

(57) ABSTRACT

A decoupling device including a lead frame and at least one capacitor unit assembly is provided. The lead frame includes a cathode terminal portion and at least two opposite anode terminal portions located at two ends of the cathode terminal portion. The two anode terminal portions are electrically connected with each other through a conductive line. The capacitor unit assembly includes multiple capacitor elements. The multiple capacitor elements of the capacitor unit assembly is connected in parallel, arrayed on the same plane and disposed on the lead frame. Each capacitor element has a cathode portion and an anode portion opposite to each other. The cathode portion of the capacitor element is electrically connected with the cathode terminal portion. The anode portion of the capacitor element is electrically connected with the anode terminal portion. When multiple capacitor unit assemblies exists, the capacitor unit assemblies are arrayed in a stacked way.

17 Claims, 22 Drawing Sheets

(51) Int. Cl.
*H01G 9/15* (2006.01)
*H01G 9/04* (2006.01)

(56) References Cited

U.S. PATENT DOCUMENTS

| | | | |
|---|---|---|---|
| 5,184,287 | A | 2/1993 | Taniguchi |
| 6,646,523 | B2 | 11/2003 | Arai et al. |
| 6,717,793 | B2 | 4/2004 | Arai et al. |
| 6,741,451 | B2 | 5/2004 | Aoyama |
| 6,836,195 | B2 | 12/2004 | Arai et al. |
| 6,911,880 | B2 | 6/2005 | Arai et al. |
| 6,947,277 | B2 | 9/2005 | Arai et al. |
| 6,977,807 | B2 | 12/2005 | Arai et al. |
| 6,977,835 | B2 | 12/2005 | Kang |
| 6,989,982 | B2 | 1/2006 | Kobayashi et al. |
| 7,005,944 | B2 | 2/2006 | Arai et al. |
| 7,031,141 | B2 | 4/2006 | Kuriyama |
| 7,057,882 | B2 | 6/2006 | Fujii et al. |
| 7,061,772 | B2 | 6/2006 | Arai et al. |
| 7,206,193 | B2 | 4/2007 | Nagasawa et al. |
| 7,215,533 | B2 | 5/2007 | Kurita et al. |
| 7,277,271 | B2 | 10/2007 | Yamaguchi et al. |
| 7,326,261 | B2 | 2/2008 | Nagasawa et al. |
| 7,352,563 | B2 | 4/2008 | Pelcak et al. |
| 7,443,654 | B2 | 10/2008 | Asami et al. |
| 7,450,366 | B2 * | 11/2008 | Kuriyama ............... 361/523 |
| 7,551,424 | B2 | 6/2009 | Kuriyama |
| 7,612,987 | B2 * | 11/2009 | Kurita et al. ............ 361/523 |
| 7,646,589 | B2 | 1/2010 | Kuriyama |
| 7,778,011 | B2 | 8/2010 | Fujii et al. |
| 8,421,557 | B2 | 4/2013 | Kurita et al. |
| 2004/0231120 | A1 | 11/2004 | Igaki et al. |
| 2004/0240248 | A1 | 12/2004 | Kang |
| 2008/0012092 | A1 | 1/2008 | Liang et al. |
| 2009/0174502 | A1 | 7/2009 | Kurita et al. |
| 2010/0073848 | A1 | 3/2010 | Kobayashi et al. |
| 2010/0140741 | A1 | 6/2010 | Liang et al. |
| 2010/0214038 | A1 | 8/2010 | Kurita et al. |

FOREIGN PATENT DOCUMENTS

| | | |
|---|---|---|
| JP | 1994120088 | 4/1994 |
| JP | 1995201917 | 8/1995 |
| JP | 1997232196 | 9/1997 |
| JP | 2001167974 | 6/2001 |
| JP | 2002313676 | 10/2002 |
| JP | 2003243257 | 8/2003 |
| JP | 200463897 | 2/2004 |
| JP | 200632880 | 2/2006 |
| JP | 2006179886 | 7/2006 |
| JP | 200712828 | 1/2007 |
| JP | 2007005760 | 1/2007 |
| JP | 2007035691 | 2/2007 |
| JP | 2007059854 | 3/2007 |
| JP | 2007116064 | 5/2007 |
| JP | 2007180327 | 7/2007 |
| JP | 2007180328 | 7/2007 |
| JP | 2007258456 | 10/2007 |
| JP | 2007273996 | 10/2007 |
| JP | 2007311567 | 11/2007 |
| JP | 2008021771 | 1/2008 |
| JP | 2008021772 | 1/2008 |
| JP | 2008021773 | 1/2008 |
| JP | 2008021774 | 1/2008 |
| JP | 2008053416 | 3/2008 |
| JP | 2008078370 | 4/2008 |
| JP | 2008103447 | 5/2008 |
| JP | 2008135424 | 6/2008 |
| JP | 2008135425 | 6/2008 |
| JP | 2008177195 | 7/2008 |
| JP | 2008300738 | 12/2008 |
| JP | 2009010068 | 1/2009 |
| JP | 2009021355 | 1/2009 |
| JP | 2009252764 | 10/2009 |
| JP | 4367212 | 11/2009 |
| JP | 2010027900 | 2/2010 |
| JP | 201056411 | 3/2010 |
| JP | 2010226139 | 10/2010 |
| TW | 200614300 | 5/2006 |
| TW | I279820 | 4/2007 |
| TW | 200839819 | 10/2008 |
| WO | 2010023990 | 3/2010 |
| WO | 2010026808 | 3/2010 |

OTHER PUBLICATIONS

Koichiro Masuda et al., "A Line Structure Component Using a Conducting Polymer," Electronics and Communications in Japan (Part II: Electronics), vol. 86, Issue. 7, Jul. 2003, pp. 1-9.

Shimo Akitoshi, "The Proadlizer for the Next-Generation Notebook and Desktop PCs," NEC Technical Journal, vol. 4, No. 1, Mar. 2009, pp. 1-4.

* cited by examiner

DECOUPLING DEVICE INCLUDING A PLURALITY OF CAPACITOR UNIT ARRAYED IN A SAME PLANE

CROSS-REFERENCE TO RELATED APPLICATION

This application is a continuation application of and claims the priority benefit of a prior application Ser. No. 13/053,195, filed on Mar. 21, 2011, now pending. The prior application Ser. No. 13/053,195 claims the priority benefit of Taiwan application serial no. 99146364, filed on Dec. 28, 2010. The entirety of each of the above-mentioned patent applications is hereby incorporated by reference herein and made a part of this specification.

TECHNICAL FIELD

The disclosure relates to a decoupling device, and more particularly to a decoupling device with a good filtering performance and a simple manufacturing process.

BACKGROUND

A solid electrolytic capacitor has such advantages as small dimension, large capacitance, and superior frequency characteristics, and can play a role of decoupling for a power source circuit of a Central Processing Unit (CPU).

Generally, a plurality of capacitor elements can be stacked on a lead frame to form a solid electrolytic capacitor having a high capacitance. For example, a three-terminal decoupling device can be categorized into a through type decoupling device and an alternately stacked type decoupling device.

The so-called through type decoupling device means that: a lead frame has two anode terminal portions, and a cathode terminal portion located between the two anode terminal portions. A through type capacitor element is used as a capacitor element, that is, a valve metal layer runs through the inside of the capacitor element and extends out of two ends of the capacitor element. A plurality of through type capacitor elements are directly stacked on the lead frame, so that valve metal layers (that is, anode portions) at two ends are electrically connected with the anode terminal portions at two ends of the lead frame, and cathode portions of the capacitor element are electrically connected with a cathode terminal portion of the lead frame.

The so-called alternately stacked type decoupling device means that: a lead frame has two anode terminal portions, and a cathode terminal portion located between the two anode terminal portions. A sheet capacitor element is used as a capacitor element, and each sheet capacitor element has one cathode portion and one anode portion opposite to each other. The capacitor elements are stacked on the lead frame, and the stacking manner of the capacitor elements is as follows: sheet capacitor elements are alternately stacked with the cathode portion of the capacitor element as a symmetrical center, and anode portions are disposed in a left-right alternate manner. Furthermore, the cathode portions are electrically connected with the cathode terminal portion, and the anode portions are electrically connected with the anode terminal portion.

However, the manufacturing process of the through type capacitor elements of the through type decoupling device is complex, which is unfavorable to reduction of the manufacturing cost of the through type decoupling device. Furthermore, the stacking manner of the capacitor elements of the alternately stacked type decoupling device easily causes stacking misalignment, so that the manufacturing yield of the alternately stacked type decoupling device is low.

SUMMARY

Accordingly, the disclosure is directed to a decoupling device, which has a simple manufacturing process, and a rather easy stacking manner of a plurality of capacitor elements of the decoupling device.

A decoupling device is introduced herein, which includes a lead frame, an insulating layer and at least one capacitor unit assembly. The lead frame includes a cathode terminal portion and at least two opposite anode terminal portions disposed at two ends of the cathode terminal portion, wherein the two anode terminal portions are electrically connected with each other through a conductive line, the cathode terminal portion includes a spacing, and the conductive line is disposed in the spacing. The insulating layer is disposed above the conductive line, wherein the insulating layer enables the cathode terminal portion and the anode terminal portions to be electrically insulated from each other. The capacitor unit assembly includes a plurality of capacitor elements in a manner of N pieces as one group and is connected with each other in parallel, wherein N is an even number, the capacitor elements with N pieces are arrayed on the same plane and are disposed on the lead frame, and each of the capacitor elements includes a cathode portion and an anode portion opposite to each other. The cathode portions of the capacitor elements almost cover all area of the cathode terminal portion and are disposed on the insulating layer, and the cathode portions of the capacitor elements are electrically connected with the cathode terminal portion. The anode portions of the capacitor elements are disposed on the anode terminal portion, and the anode portions of the capacitor elements are electrically connected with the anode terminal portion, wherein the respective cathode portions are adjacent to each other, while the respective anode portions are far away from each other.

Based on the foregoing description, the decoupling device according to the disclosure adopts a manner that the capacitor elements are arrayed on the same plane and connected with each other in parallel, so as to stack the capacitor elements on the lead frame. In this way, the Equivalent Series Resistance (ESR) can be effectively reduced, and the manufacturing process is very simple. Additionally, the decoupling device according to the disclosure can form a multi-terminal structure by designing the arraying manner of the lead frame and the capacitor elements, so as to reduce the Equivalent Series Inductance (ESL). Furthermore, the transmission line structure formed between two anode portions of the decoupling device is utilized, the transmission line structure can generate an inductor during the operation at a high frequency, and the inductor and capacitors form an equivalent filtering circuit.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 16A to FIG. 16C are schematic views of yet another decoupling device having a multi-terminal structure according to an embodiment of the disclosure, in which, FIG. 16A is a schematic view of a lead frame of the decoupling device, FIG. 16B is a schematic view that a plurality of capacitor elements on the same plane is arrayed on the lead frame, and FIG. 16C is a schematic view of the decoupling device observed from the bottom surface.

FIG. 17A to FIG. 17C are schematic views of still another decoupling device having a multi-terminal structure according to an embodiment of the disclosure, in which, FIG. 17A is a schematic view of a lead frame of the decoupling device, FIG. 17B is a schematic view that a plurality of capacitor elements on the same plane is arrayed on the lead frame, and FIG. 17C is a schematic view of the decoupling device observed from the bottom surface.

DETAILED DESCRIPTION OF DISCLOSED EMBODIMENTS

The disclosure proposes a decoupling device including a lead frame and at least one capacitor unit assembly. The lead frame includes a cathode terminal portion and at least two opposite anode terminal portions disposed at two ends of the cathode terminal portion. The two anode terminal portions are electrically connected with each other through a conductive line. The capacitor unit assembly includes a plurality of capacitor elements. The plurality of capacitor elements of the capacitor unit assembly is connected in parallel, arrayed on the same plane, and disposed on the lead frame. Each capacitor element has a cathode portion and an anode portion opposite to each other. The cathode portion of the capacitor element is electrically connected with the cathode terminal portion. The anode portion of the capacitor element is electrically connected with the anode terminal portion. When multiple capacitor unit assemblies exist, the capacitor unit assemblies are arrayed in a stacked manner.

The decoupling device according to the disclosure adopts a manner that the plurality of capacitor elements is arrayed on the same plane and connected with each other in parallel, has a simple manufacturing process, and can reduce an ESR.

Additionally, the capacitor element adopts a sheet type capacitor element having the cathode portion and the anode portion rather than a through type capacitor element, so the manufacturing process is simple. Furthermore, the at least two anode terminal portions of the lead frame are connected with each other to form a transmission line structure, and this transmission line structure forms an inductor in a high frequency state, and the inductor can form a filter together with a capacitor of the capacitor element. Furthermore, the lead frame can have a multi-terminal structure, and shorten a current transmission distance between adjacent terminals, so as to reduce an ESL. Hereinafter, several embodiments are listed to further illustrate technical contents of the disclosure.

Figure 1A:
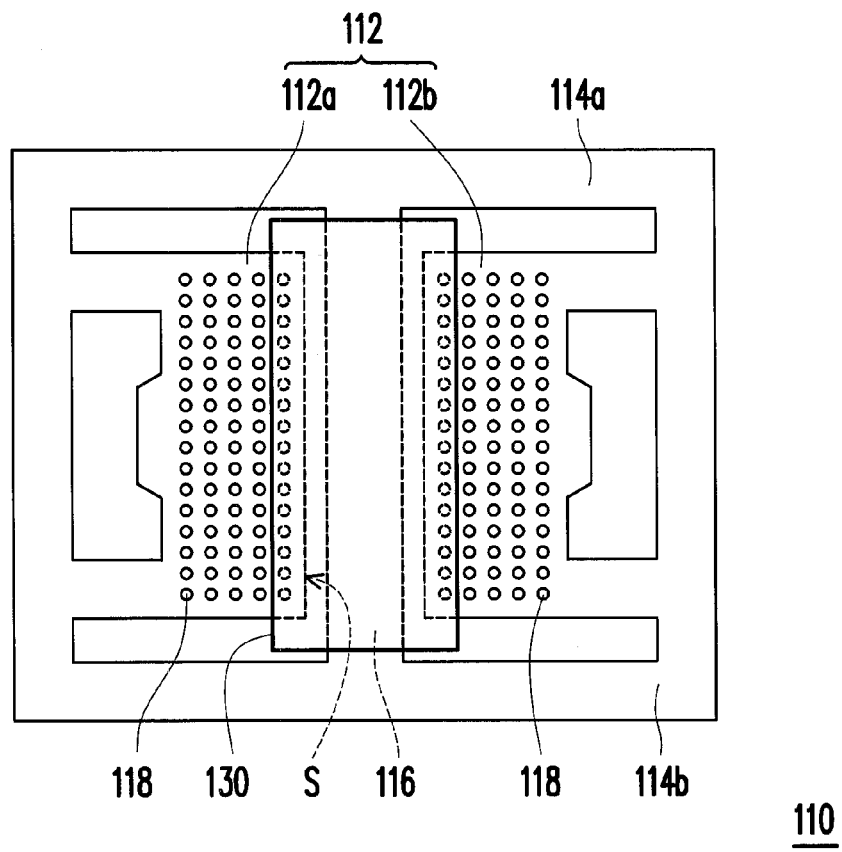
FIG. 1A to FIG. 1C are schematic views of a lead frame and capacitor elements of a decoupling device according to an embodiment of the disclosure.
Figure 1B:
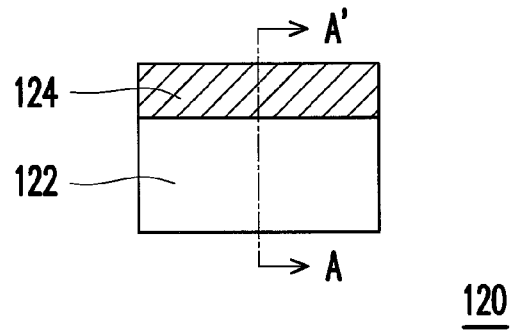
Figure 1C:
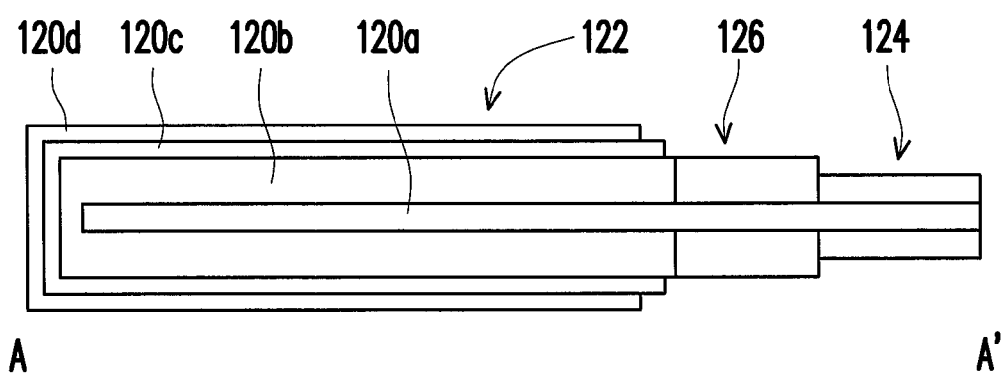
Figure 2A:
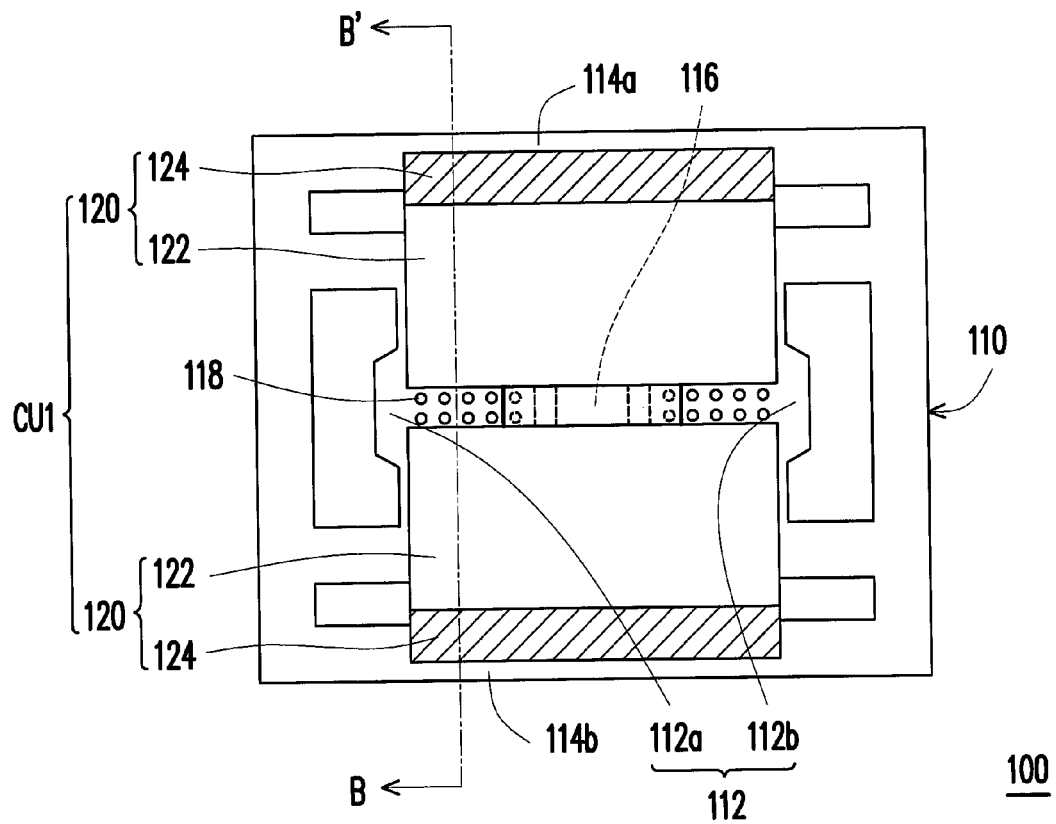
FIG. 2A and FIG. 2B are schematic views of a decoupling device and an equivalent circuit thereof respectively according to an embodiment of the disclosure, in which, the capacitor elements arrayed on the same plane are disposed on the lead frame.
Figure 2B:
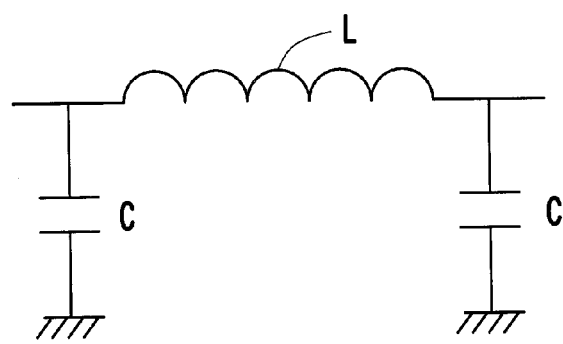

FIG. 1A to FIG. 1C are schematic views of a lead frame and capacitor elements of a decoupling device according to an embodiment of the disclosure. FIG. 2A and FIG. 2B are schematic views of a decoupling device and an equivalent circuit thereof respectively according to an embodiment of the disclosure, in which, the capacitor elements arrayed on the same plane are disposed on the lead frame. Referring to FIG. 1A to FIG. 1C, and FIG. 2A to FIG. 2B simultaneously, a decoupling device 100 includes a lead frame 110 and a plurality of capacitor elements 120. The lead frame 110 includes a cathode terminal portion 112 and at least two opposite anode terminal portions 114a and 114b disposed at two ends of the cathode terminal portion 112. The two anode terminal portions 114a and 114b are electrically connected with each other through a conductive line 116. The capacitor elements 120 are disposed on the lead frame 110, and each capacitor element 120 has a cathode portion 122 and an anode portion 124 opposite to each other, in which, the capacitor elements 120 are arrayed into a first capacitor unit assembly CU1 in a manner of N pieces as one group (N is equal to 2 in FIG. 2) on the same plane, the capacitor elements 120 of the first capacitor unit assembly CU1 are connected in parallel, and N is larger than or equal to 2. A number of the capacitor elements 120 can be an even number. The cathode portions 122 of the capacitor elements 120 are electrically connected with the cathode terminal portion 112, and the anode portions 124 of the capacitor elements 120 are electrically connected with the anode terminal portions 114a and 114b.

Referring to FIG. 1A continuously, the cathode terminal portion 112 can have a spacing S, and the conductive line 116 is disposed in the spacing S. More specifically, the spacing S can divide the cathode terminal portion 112 into two sub cathode terminal portions 112a and 112b, so as to enable the conductive line 116 to be located in the spacing S between the two sub cathode terminal portions 112a and 112b. In this way, the cathode terminal portion 112, the anode terminal portions 114a and 114b and the conductive line 116 of the lead frame 110 can be located at the same plane, so it can be ensured that cathode portions 122 and anode portions 124 of a plurality of capacitor elements 120 can be located on the same plane of the lead frame 110. As a result, the yield of a plurality of subsequent capacitor elements 120 electrically connected with each other can be improved.

Additionally, the cathode terminal portion 112 can further include a rough structure 118 located at a surface of the cathode terminal portion 112. The rough structure 118 can improve the adhesion between the capacitor element 120 and the cathode terminal portion 112. The rough structure 118 can be formed by performing a molding process on the cathode terminal portion 112. Furthermore, the decoupling device 100 can further include an insulating layer 130 disposed above the conductive line 116, and the insulating layer 130 enables the cathode terminal portion 112 and the anode terminal portions 114a and 114b to be electrically insulated from each other. Generally, the insulating layer 130 can be formed by attaching an insulating adhesive tape on an appropriate position of the lead frame 110.

Referring to FIG. 1B and FIG. 1C, the capacitor element 120 can be a sheet capacitor element, and have one cathode portion 122 and one anode portion 124 at two opposite ends respectively. An internal structure of the capacitor element 120 can be seen from a section line A-A' of the capacitor element 120, that is, the capacitor element 120 can include a valve metal layer 120a, a dielectric layer 120b, a conductive polymer layer 120c, and a cathode conductive layer 120d. The dielectric layer 120b is formed on the valve metal layer 120a. The conductive polymer layer 120c is formed on the dielectric layer 120b. The cathode conductive layer 120d is formed on the conductive polymer layer 120c. Additionally, in the capacitor element 120, an insulating portion 126 can be further disposed between the cathode portion 122 and the anode portion 124, so as to isolate the cathode portion 122 from the anode portion 124.

Referring to FIG. 2A, in the decoupling device 100, a plurality of capacitor elements 120 is arrayed into a first capacitor unit assembly CU1 in a manner of N pieces as one group (N is equal to 2 in FIG. 2) on the same plane, and the capacitor elements 120 are connected with each other in parallel. It should be noted that, two capacitor elements 120 in the first capacitor unit assembly CU1 are arrayed on the same plane instead of being stacked with each other. In the disclosure, the so-called "the same plane" refers to that: all capacitor elements 120 in the first capacitor unit assembly CU1 are arrayed in the same layer.

It can be seen in FIG. 2A that, for the two capacitor elements 120 located above and below the picture in FIG. 2A, their respective cathode portions 122 are adjacent to each other, while their respective anode portions 124 are far away from each other. The cathode portions 122 can almost cover all area of the cathode terminal portion 112 to achieve a good electrical connection effect. Accordingly the decoupling device 100 adopts a manner that a plurality of capacitor elements 120 is arrayed on the same plane and connected with each other in parallel, has a rather simple manufacturing process, and can effectively reduce an ESR.

Particularly, as shown in an equivalent circuit diagram in FIG. 2B, a transmission line structure formed by a conductive line 116 generates an inductor L during high frequency operation, and this inductor L and capacitors C of the two capacitor elements 120 form a CLC circuit, that is, a so-called π type filter. In this way, a noise can be effectively cancelled during the high frequency operation.

Figure 3:
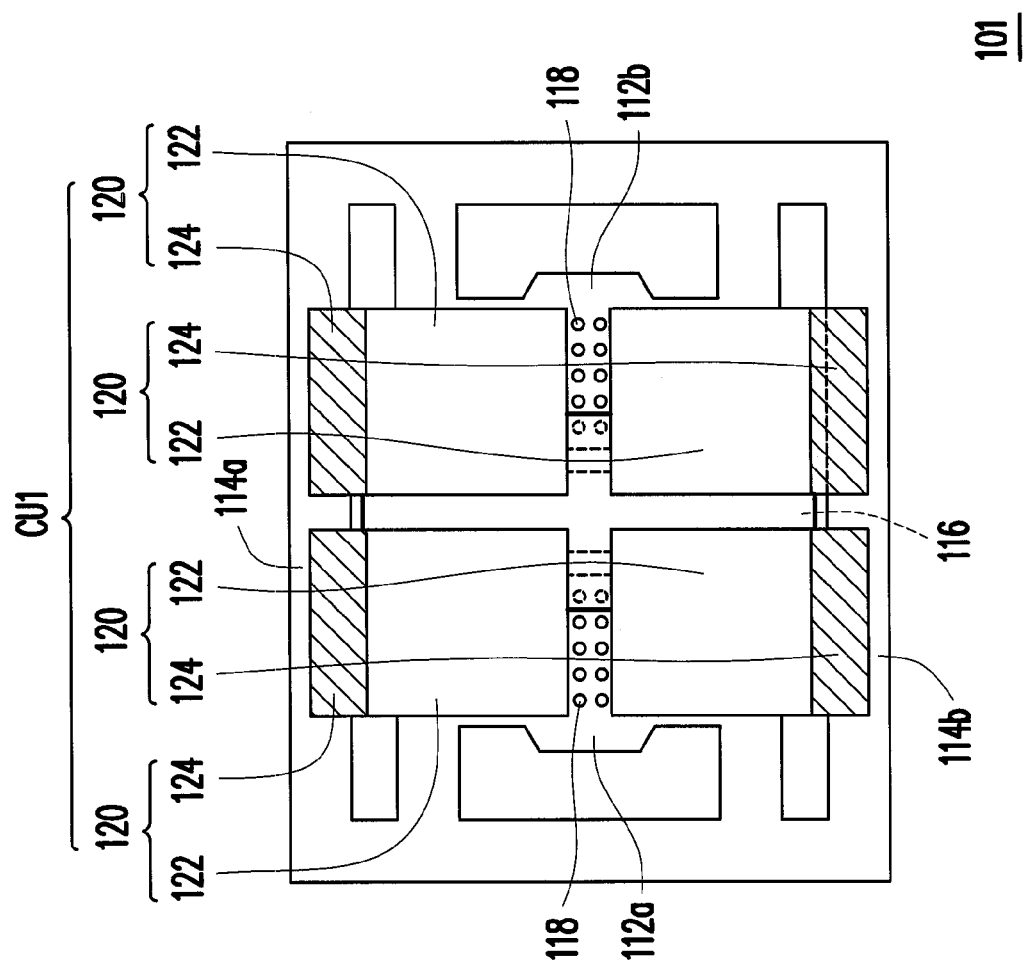
FIG. 3 is a schematic view of another decoupling device according to an embodiment of the disclosure.

FIG. 3 is a schematic view of another decoupling device according to an embodiment of the disclosure. Referring to FIG. 3, a decoupling device 101 is similar to the decoupling device 100 as shown in FIG. 2A, and the same devices are labelled with the same symbols. It should be noted that, the capacitor elements 120 are arrayed into a first capacitor unit assembly CU1 in a manner of N pieces as one group (N is equal to 4 in FIG. 3) on the same plane, and the capacitor elements 120 of the first capacitor unit assembly CU1 are connected in parallel. In this way, an appropriate number of capacitor elements 120 can be randomly arrayed on the lead frame 110 in a manner of arraying on the same plane, so as to obtain a decoupling device with a required capacitance value. The manner of arraying the plurality of capacitor elements 120 on the same plane is rather simple, so the manufacturing process efficiency can be improved.

Figure 4:
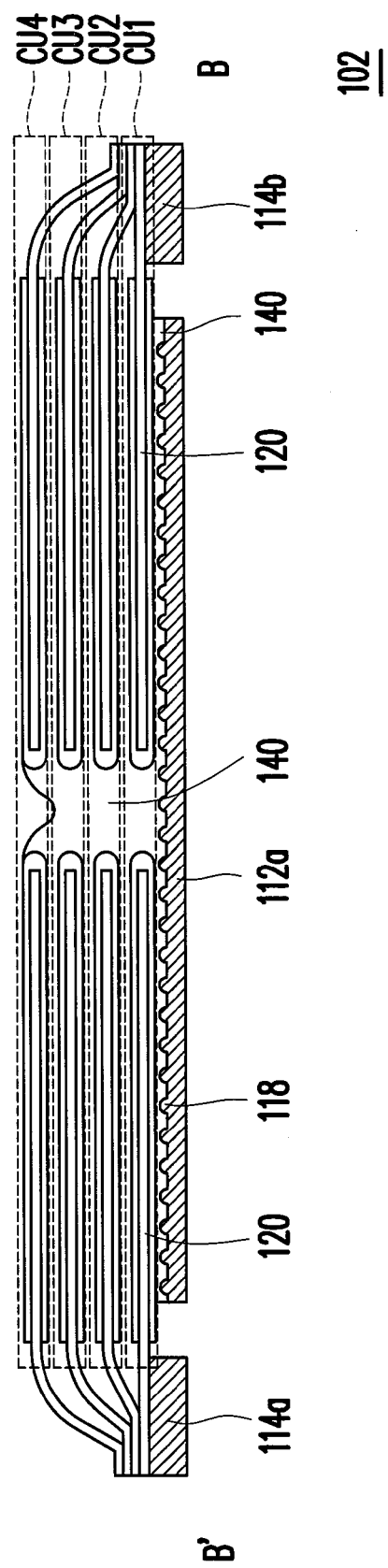
FIG. 4 is a schematic sectional view of yet another decoupling device according to an embodiment of the disclosure, and the section in FIG. 4 is obtained by observing in a direction of the line B-B' in FIG. 2A.

FIG. 4 is a schematic sectional view of yet another decoupling device according to an embodiment of the disclosure, and the section in FIG. 4 is obtained by observing in a direction of the line B-B' in FIG. 2A. Referring to FIG. 4, when multiple capacitor unit assemblies exist, the capacitor unit assemblies are arrayed in a stacked manner. More specifically, in the decoupling device 102, capacitor elements 120 can be arrayed into a second capacitor unit assembly CU2 on the same plane in a manner of N pieces as one group, the capacitor elements 120 of the second capacitor unit assembly CU2 are connected in parallel, and the second capacitor unit assembly CU2 is stacked on the first capacitor unit assembly CU1. That is to say, multiple groups of capacitor unit assemblies can be stacked in a normal direction of the plane of the lead frame 110, and a number of the stacked capacitor unit assemblies is adjustable. As shown in FIG. 4, capacitor unit assemblies CU2 to CU4 can be stacked above the first capacitor unit assembly CU1 with each other, that is, totally four groups of capacitor unit assemblies CU1 to CU4 are stacked, so as to obtain the decoupling device 102 with a large capacitance.

Referring to FIG. 4 again, the capacitor elements 120 can be electrically connected with each other with a conductive adhesive 140. Furthermore, it should be noted that, the conductive adhesive 140 can cooperate with the rough structure 118 on a cathode terminal portion 112a, so that the capacitor element 120 and the cathode terminal portion 112a form the good adhesion.

Figure 5:
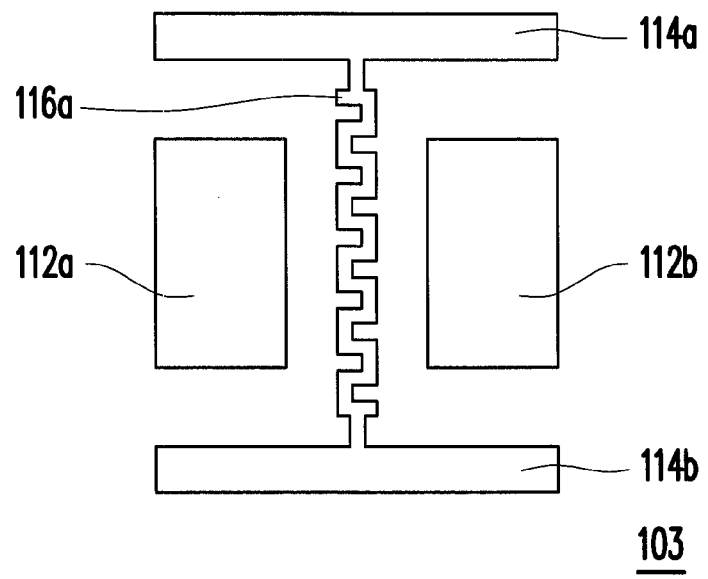
FIG. 5 is a schematic view of a decoupling device according to another embodiment of the disclosure, in which the capacitor element is omitted.

Additionally, the value of the inductor formed by the conductive line 116 can further be regulated according to the design requirement. FIG. 5 is a schematic view of a decoupling device according to another embodiment of the disclosure, in which the capacitor element is omitted. Referring to FIG. 5, in this decoupling device 103, a conductive line 116a can be of a consecutive bending structure. The conductive line 116a of this consecutive bending structure can be formed in such manners as punching or etching. The consecutive bending structure can be of a shape which can increase the total length of the conductive line 116 with a sin wave, a square wave, or a zigzag wave, and thereby, the total length and the area of the conductive line 116a can be adjusted, so as to regulate the inductance value of the decoupling device 103 in a case of high frequency operation.

Figure 6:
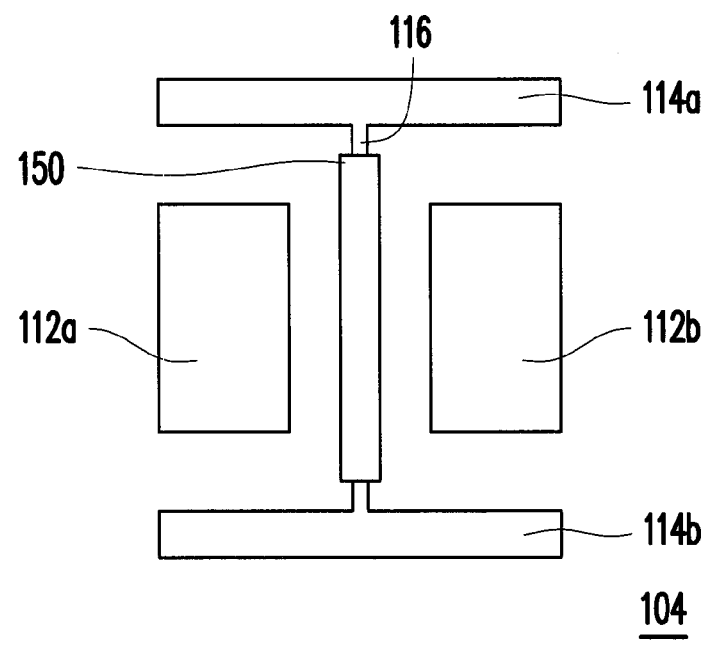
FIG. 6 is a schematic view of a decoupling device according to yet another embodiment of the disclosure, in which the capacitor element is omitted.

FIG. 6 is a schematic view of a decoupling device according to yet another embodiment of the disclosure, in which the capacitor element is omitted. Referring to FIG. 6, this decoupling device 104 can further include a device 150 having inductance characteristics, which is connected with a conductive line 116 in series or in parallel. This device 150 having the inductance characteristics is, for example, a chip inductor. Thereby, the inductance value of the decoupling device 104 can be regulated in a case of high frequency operation.

Figure 7:
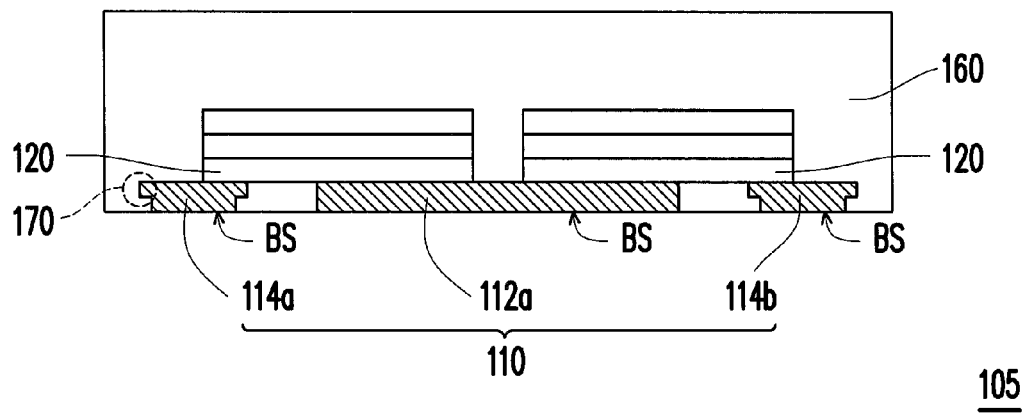
FIG. 7 is a schematic sectional view of a decoupling device according to still another embodiment of the disclosure.

FIG. 7 is a schematic sectional view of a decoupling device according to still another embodiment of the disclosure. Referring to FIG. 7, this decoupling device 105 can further include a packaging resin 160 which partially wraps the capacitor elements 120 and the lead frame 110, and the packaging resin 160 exposes bottom surfaces BS of the cathode terminal portion 112a and the anode terminal portions 114a and 114b. The packaging resin 160 can integrate the capacitor elements 120 and the lead frame 110 into one device, and can isolate outside air and moisture.

Figure 8:
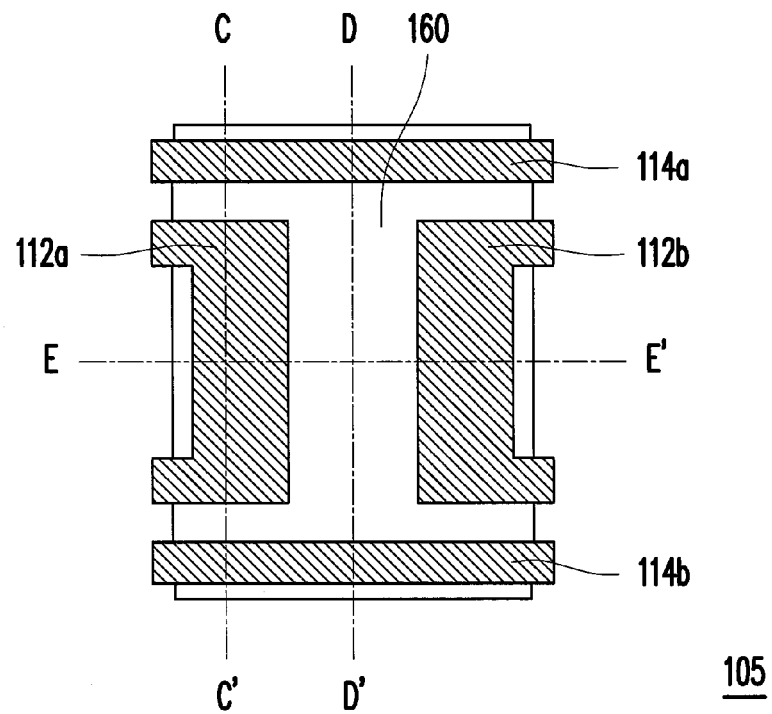
FIG. 8 is a schematic view of the decoupling device observed from the bottom surface in FIG. 7.
Figure 9A:
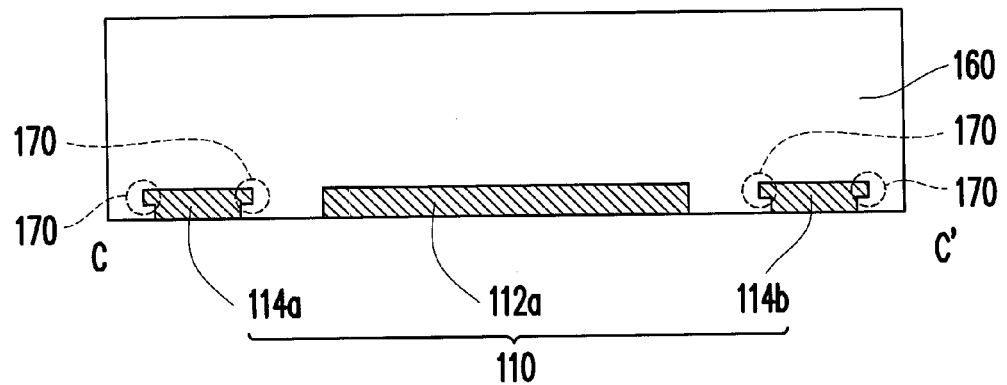
FIG. 9A to FIG. 9C are schematic sectional views along the line C-C', the line D-D' and the line E-E' in FIG. 8 respectively, and the capacitor element is omitted in FIG. 9A to FIG. 9C.
Figure 9B:
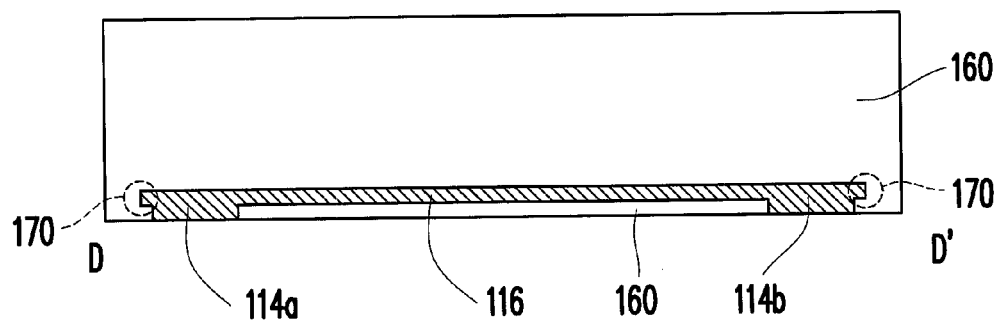
Figure 9C:
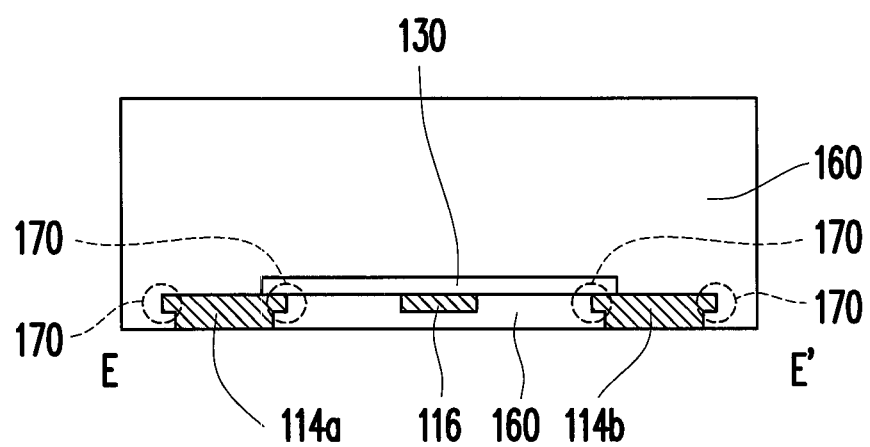

FIG. 8 is a schematic view of the decoupling device observed from the bottom surface in FIG. 7. FIG. 9A to FIG. 9C are schematic sectional views along the line C-C', the line D-D' and the line E-E' in FIG. 8 respectively, and the capacitor element is omitted in FIG. 9A to FIG. 9C. Referring to FIG. 7, FIG. 8, and FIG. 9A to FIG. 9C simultaneously, in the decoupling device 105, the sub cathode terminal portions 112a and 112b and the anode terminal portions 114a and 114b can each further include an engaging structure 170, which is disposed at edges of the sub cathode terminal portions 112a and 112b and edges of the anode terminal portions 114a and 114b, and the engaging structures 170 are engaged in the packaging resin 160. The engaging structures 170 can enable the lead frame 110 to be more stably fixed in the packaging resin 160, thereby improving the wrapping effect and the stability of the packaging resin for the lead frame 110 and the capacitor element 120. The engaging structures 170 are formed by, for example, pressing the edges of the cathode terminal portions 112a and 112b and the edges of the anode terminal portions 114a and 114b.

Additionally, it should be noted that, as shown in FIG. 9C, the packaging resin 160 can completely encapsulate the conductive line 116. However, in another embodiment, the packaging resin can also expose part of the conductive line 116 (not shown). In the embodiment that the packaging resin 160 exposes a part of the conductive line 116, a device 150 having inductance characteristics can be disposed on the exposed conductive line 116 easily with the technology as shown in FIG. 6, so as to regulate the inductance.

Figure 10:
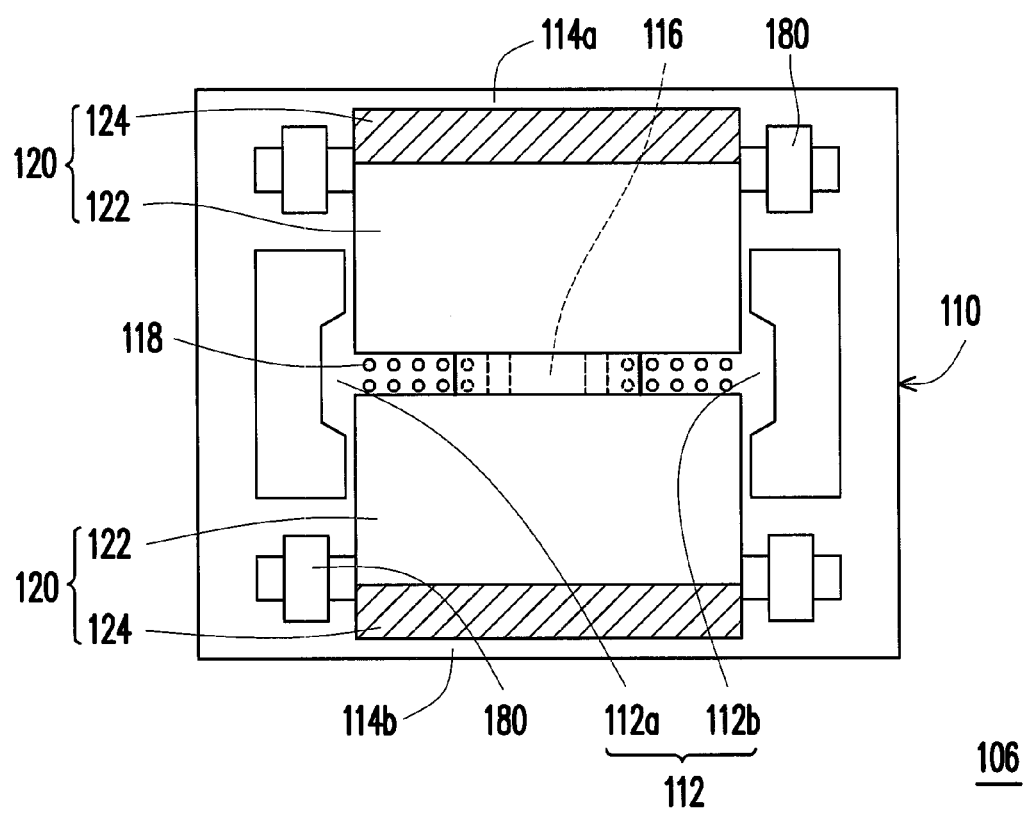
FIG. 10 is a schematic view of still another decoupling device according to an embodiment of the disclosure.

FIG. 10 is a schematic view of still another decoupling device according to an embodiment of the disclosure. Referring to FIG. 10, this decoupling device 106 further includes at least one ceramic capacitor 180 (four as shown in FIG. 10), which are connected in parallel between the cathode terminal portions 112a and 112b and the anode terminal portions 114a and 114b. With the additional ceramic capacitors 180 connected in parallel, the capacitance of the decoupling device 106 can be regulated according to the design requirement.

Figure 11:
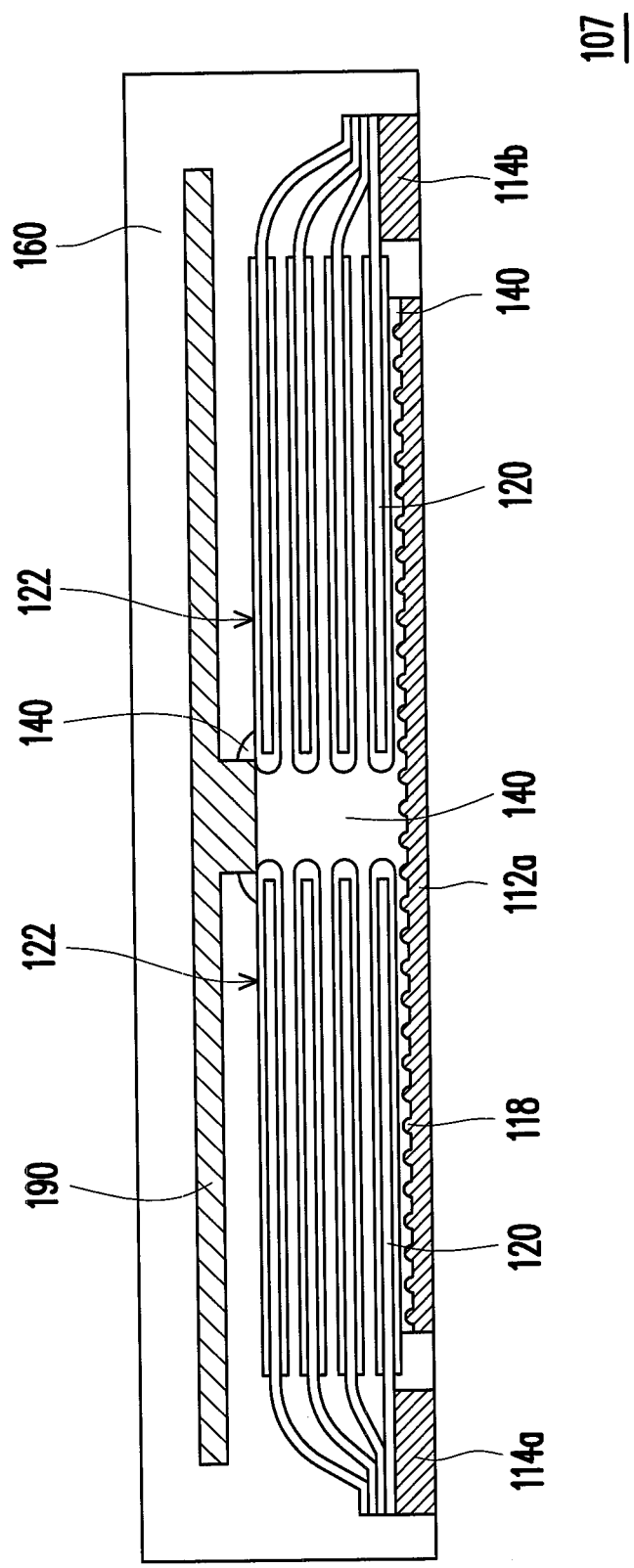
FIG. 11 is a schematic view of yet another decoupling device according to an embodiment of the disclosure.

FIG. 11 is a schematic view of yet another decoupling device according to an embodiment of the disclosure. Referring to FIG. 11, a decoupling device 107 in FIG. 11 is similar to the decoupling device 102 in FIG. 4. It should be noted that, the decoupling device 107 further includes an anti-electromagnetic wave layer 190, which covers capacitor elements 120 at the above of the capacitor elements 120. With the electromagnetic wave baffle plate 190, the electromagnetic wave interference of the outside electromagnetic wave to the decoupling device 107 can be isolated.

Referring to FIG. 11 again, the anti-electromagnetic wave layer 190 can be of a shielding layer (a reflective type), an absorbing material, or a multilayer composite structure combining the shielding and the absorbing material, which can be made of, for example, a metal plate, a conductive polymer material, a magnetic metal oxide, or a nano-scale composite material, so as to isolate the interference of the outside electromagnetic wave to the decoupling device 107. The anti-electromagnetic wave material 190 can also block the electromagnetic wave generated by the internal power source signal transmission of the decoupling device 107, so as to prevent the electromagnetic wave from interfering an active device (not shown) located outside the decoupling device 107. As shown in FIG. 11, the anti-electromagnetic wave layer 190 can also be electrically connected with the cathode portion 122 of the capacitor element 120 through the conductive adhesive 140, so as to be grounded. However, in another embodiment, the anti-electromagnetic wave layer 190 may not be electrically connected with the cathode portion 122 of the capacitor element 120.

Figure 12:
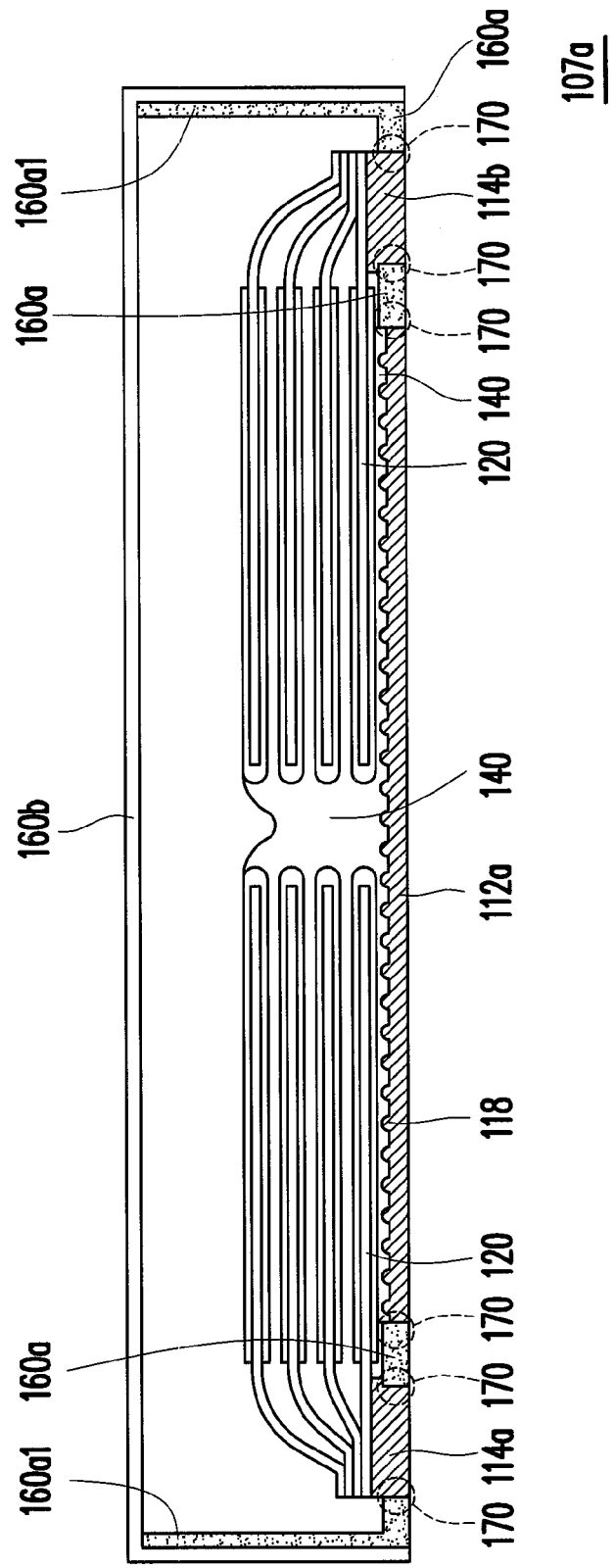
FIG. 12 is a schematic sectional view of a decoupling device according to yet another embodiment of the disclosure.

FIG. 12 is a schematic sectional view of a decoupling device according to yet another embodiment of the disclosure. Two lid bodies can be utilized to wrap a plurality of capacitor elements 120. Referring to FIG. 12, the decoupling device 107a can further include a first lid body 160a and a second lid body 160b opposite to each other. The first lid body 160a and the second lid body 160b wrap the plurality of capacitor elements 120, and the first lid body 160a exposes bottom surfaces of the cathode terminal portion 112a and the anode terminal portions 114a and 114b.

Additionally, the cathode terminal portions 112a and the anode terminal portions 114a and 114b can further include an engaging structure 170, which is disposed at an edge of the cathode terminal portion 112a and edges of the anode terminal portions 114a and 114b, and the engaging structures 170 are engaged in the first lid body 160a. As a result, the engaging structure 170 can be combined with the first lid body 160a, so that the structure of the entire decoupling device 107a is more stable. Furthermore, the first lid body 160a has an additional extending portion 160a1 around the lead frame 110. After the capacitor elements 120 are stacked, the second lid body 160b is mounted onto the first lid body 160a.

Figure 13A:
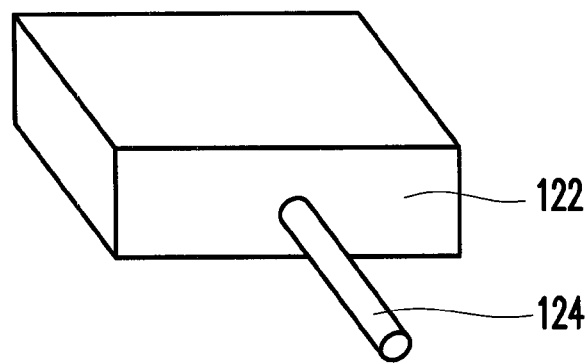
FIG. 13A is a schematic view of a capacitor element of a decoupling device according to still another embodiment of the disclosure.
Figure 13B:
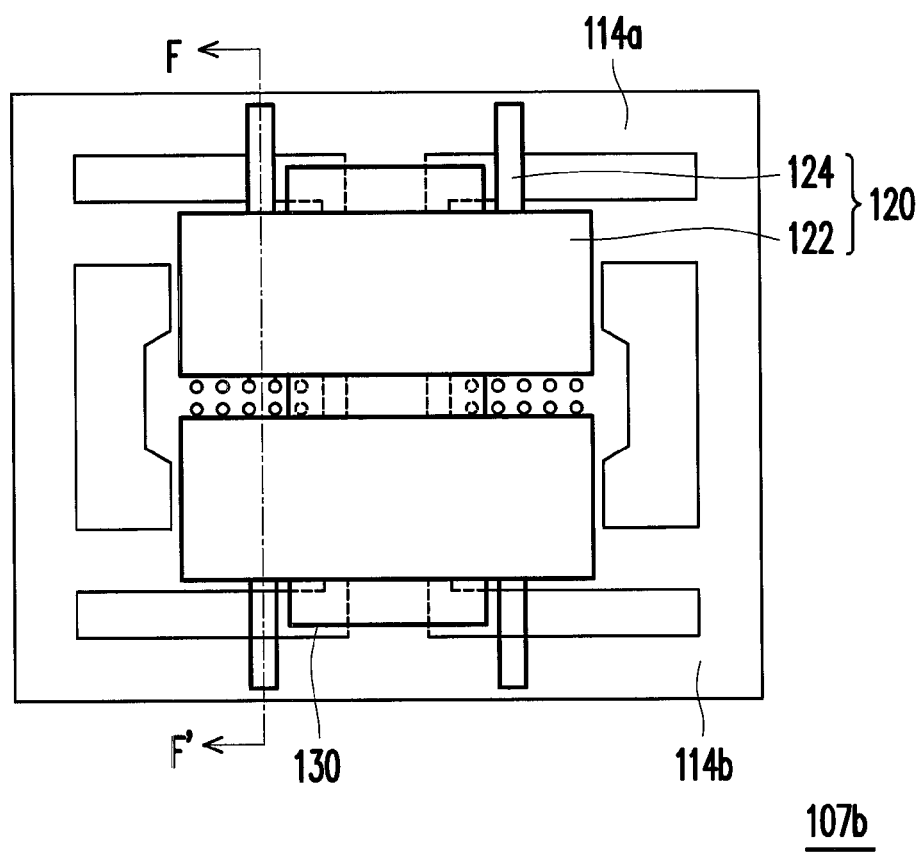
FIG. 13B is a schematic view that the capacitor elements on the same plane are disposed on a lead frame.
Figure 13C:
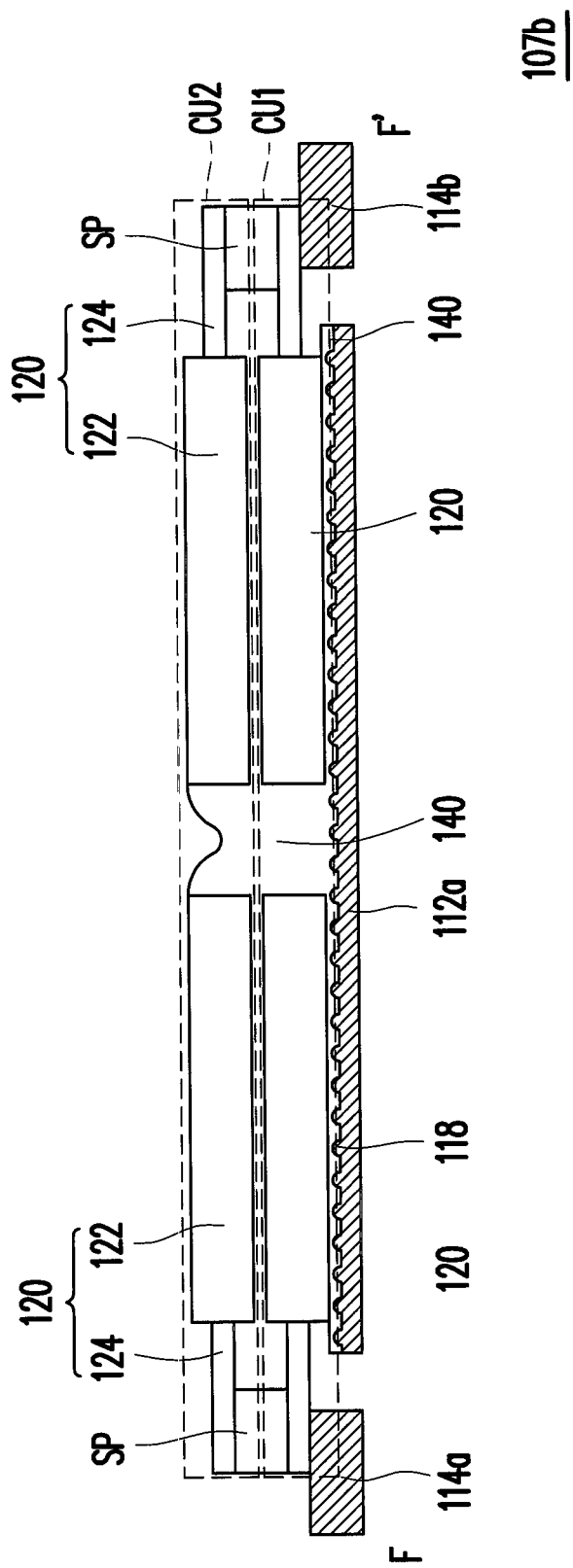
FIG. 13C is a schematic sectional view along the line F-F' in FIG. 13A.

FIG. 13A is a schematic view of a capacitor element of a decoupling device according to still another embodiment of the disclosure. FIG. 13B is a schematic view that the capacitor element on the same plane is disposed on a lead frame. FIG. 13C is a schematic sectional view along the line F-F' in FIG. 13A. Referring to FIG. 13A to FIG. 13C together, this decoupling device 107b is similar to the decoupling devices 100 in FIG. 1A to FIG. 1C, and FIG. 2A, and the same devices are labelled with the same symbols. It should be noted that, each capacitor element 120 is a capacitor element with a tantalum capacitor, a valve metal layer 120a is made of tantalum metal, a dielectric layer 120b is made of a tantalum oxide, and a cathode conductive layer 120d is made of a carbon paste-silver paste mixture. An anode portion 124 at least includes an extending conductive line, which is electrically connected with an anode terminal portion 114a.

More specifically, the anode portion 124 of the each capacitor element 120 can be formed as at least one extending conductive line (two as shown in FIG. 13B). However, the anode portion 124 of the each capacitor element 120 can be formed as more than two extending conductive lines, which is helpful in shortening the conductive path.

Furthermore, referring to FIG. 13C, when the tantalum capacitor is used as the capacitor element, the height difference is generated between anode portions 124 stacked with each other. Therefore, the decoupling device 107b can further include a plurality of conductive spacers SP located between anode portions 124 of capacitor elements 120 of capacitor unit assemblies CU1 and CU2 stacked with each other, so as to compensate the height difference.

The decoupling devices 100 to 107b adopt the multi-terminal structure, which can shorten the current transmission distance between adjacent terminals, so as to reduce the ESL. Hereinafter, several embodiments are listed to further illustrate structures of decoupling devices which can effectively reduce the ESL.

Figure 14:
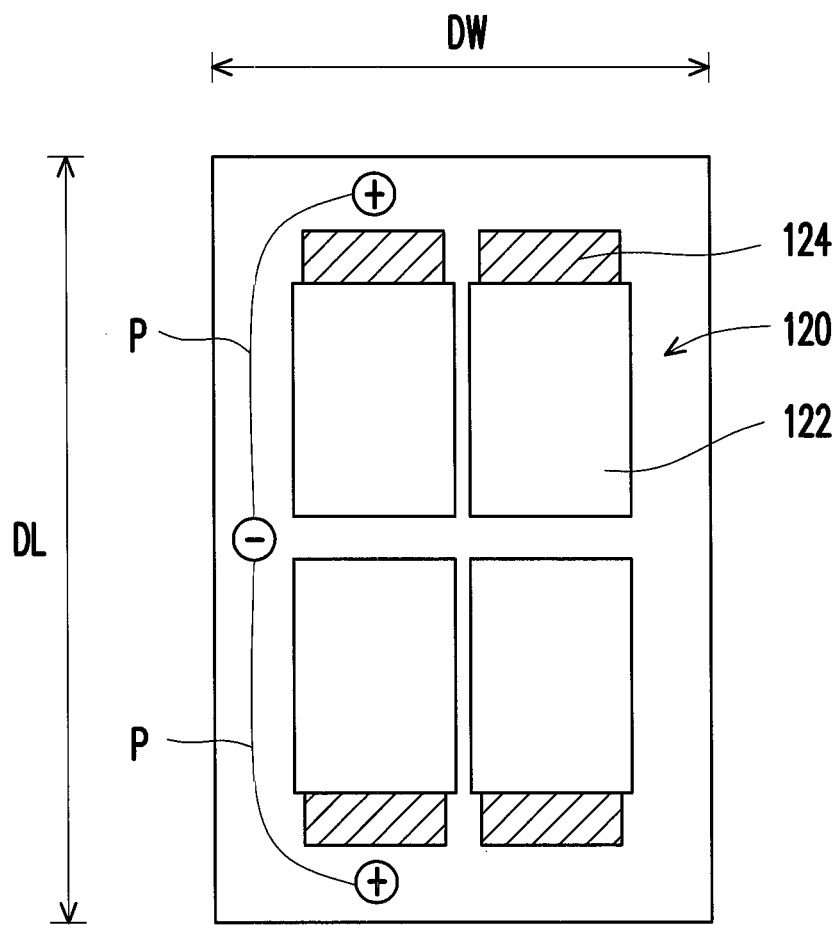
FIG. 14 is a schematic view of the manner in which a plurality of capacitor elements of the decoupling device in FIG. 3 is arrayed on the same plane.
Figure 15A:
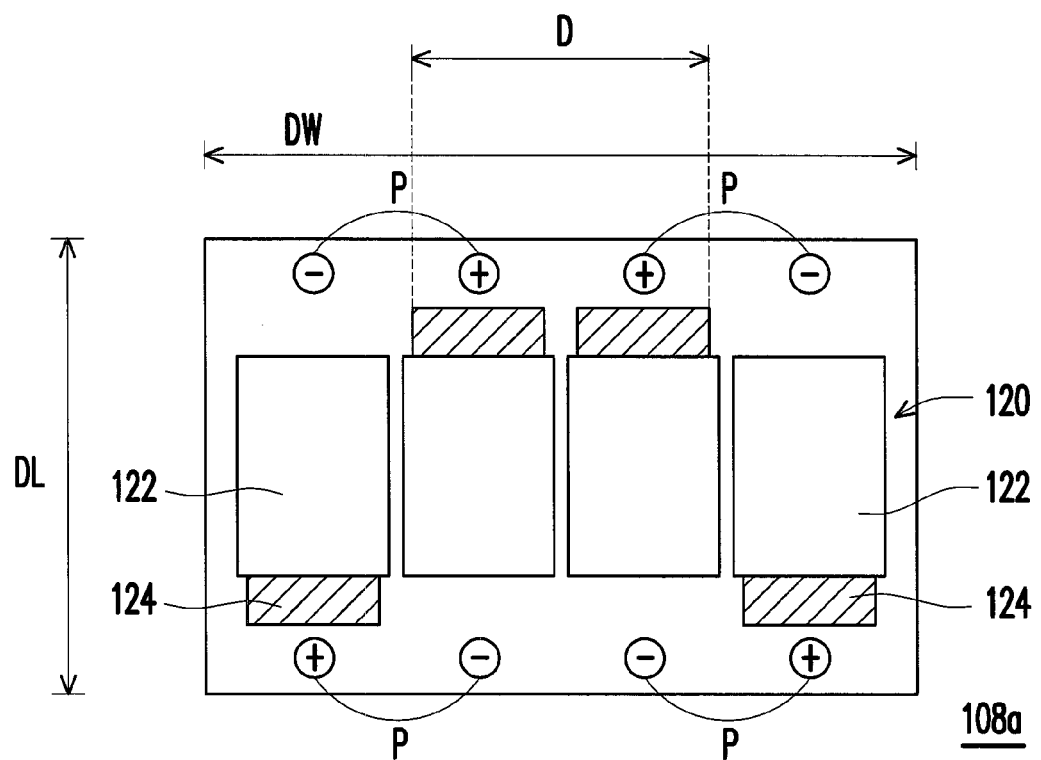
FIG. 15A and FIG. 15B are schematic views of another two manners in which a plurality of capacitor elements is arrayed on the same plane.
Figure 15B:
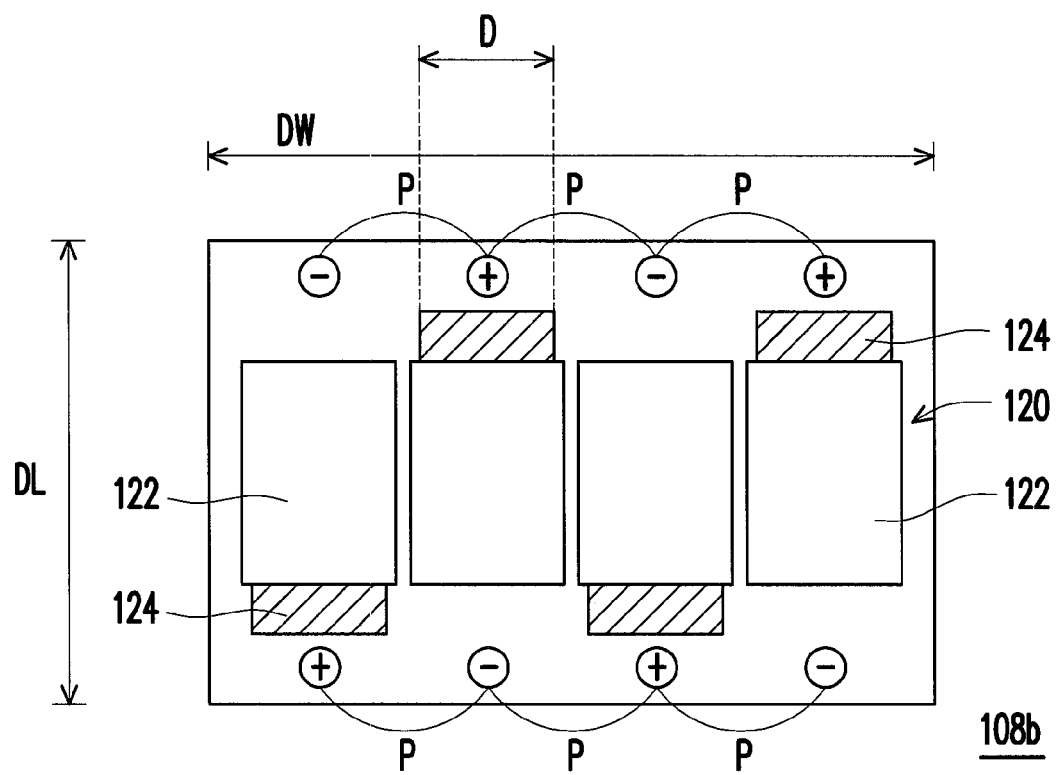

FIG. 14 is a schematic view of the manner in which the plurality of capacitor elements of the decoupling device in FIG. 3 is arrayed on the same plane. FIG. 15A and FIG. 15B are schematic views of another two manners in which a plurality of capacitor elements are arrayed on a same plane. Referring to FIG. 14 firstly, cathode portions 122 of capacitor elements 120 are disposed adjacent to each other in the length direction DL, and anode portions 124 of the capacitor elements 120 are disposed adjacent to each other in the width direction DW. It can be seen in FIG. 14 that, a current transmission distance P is formed between a plurality of terminals, that is, the current transmission distance P exists between an anode portion 124 and a cathode portion 122.

Referring to FIG. 15A and FIG. 15B again, the plurality of capacitor elements 120 is arrayed in a set direction (that is, the width direction DW), and anode portions 124 of two adjacent capacitor elements 120 are staggered with each other in a predetermined spacer number D, where D is larger than or equal to 1.

Comparing FIG. 14 with FIG. 15A and FIG. 15B, in FIG. 15A and FIG. 15B, instead, a side with a longer length is regarded as the width direction DW, and a side with a shorter length is regarded as the length direction DL, that is, FIG. 15A and FIG. 15B show a "reverse type" decoupling device.

More specifically, in a decoupling device 108a in FIG. 15A, an anode portion 124 of a first capacitor element 120 counting from the left faces down, anode portions 124 of a second capacitor element 120 and a third capacitor element 120 counting from the left face up, and an anode portion 124 of a fourth capacitor element 120 counting from the left faces down; that is to say, every two (the spacer number D is equal to 2) anode portions 124, the anode portion 124 changes the facing direction (up or down) to be staggered with each other. Particularly, the current transmission path P in FIG. 15A is shorter relative to the current transmission path P in FIG. 12, and the shorter current transmission path P can generate the effect of reducing the ESL.

Likewise, in a decoupling device 108b in FIG. 15B, counting from the left, every other (the spacer number D is equal to 1) anode portion 124 of the capacitor element 120 changes the facing direction, that is, counting from the left, the anode portions 122 of the capacitor elements 120 face down, up, down and up respectively. In this way, besides that the decoupling device 108b in FIG. 15B can shorten the current transmission path P, and relative to a situation that no current transmission exists between part of the capacitor elements (two capacitor elements 120 in the middle of FIG. 15A) of the decoupling device 108a in FIG. 15A, the decoupling device 108b in FIG. 15B can enable all adjacent capacitor elements 120 to play a current transmission role.

It can be known from the foregoing description that, the "reverse type" decoupling devices 108a and 108b in FIG. 15A and FIG. 15B can further shorten the current transmission path P, so as to further reduce the ESL.

Figure 16A:
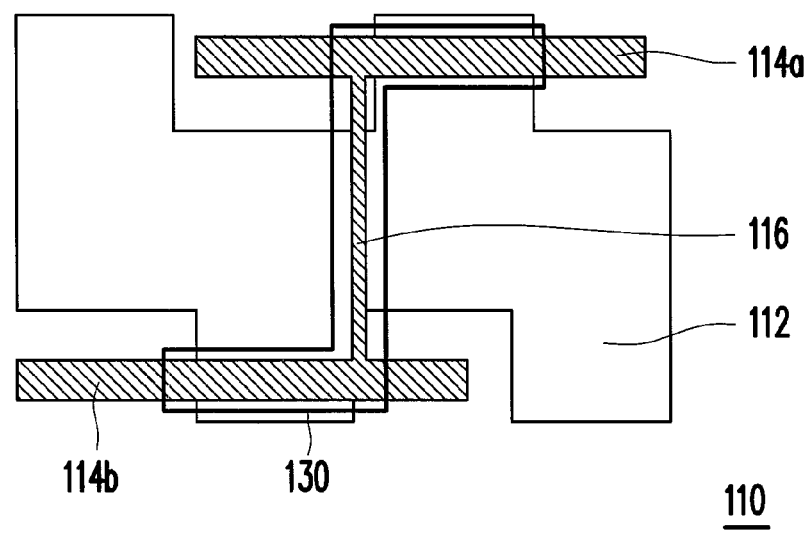
Figure 16B:
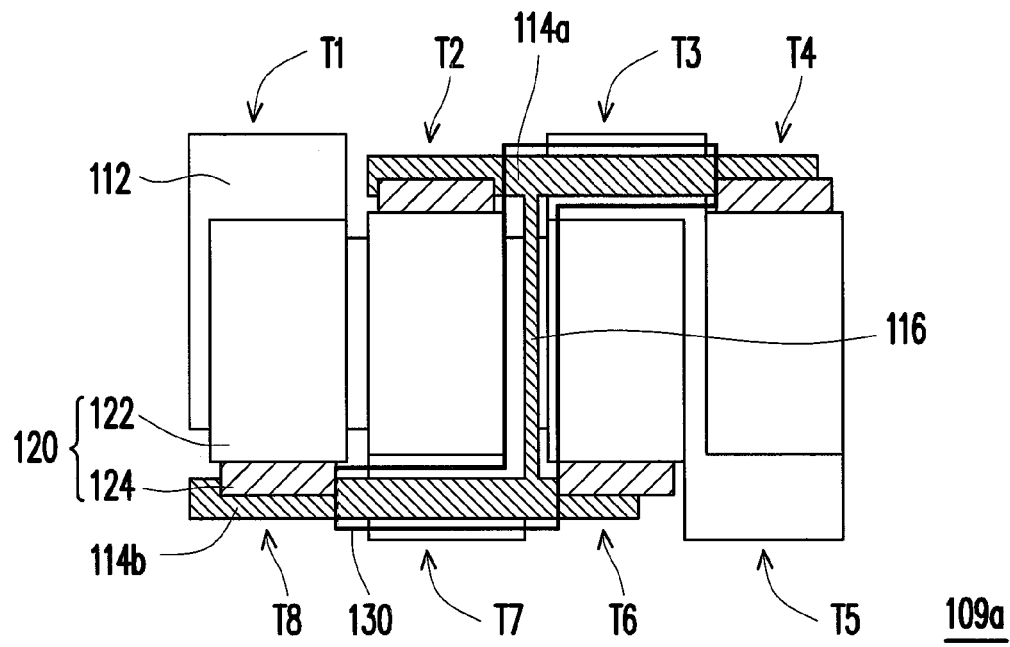
Figure 16C:
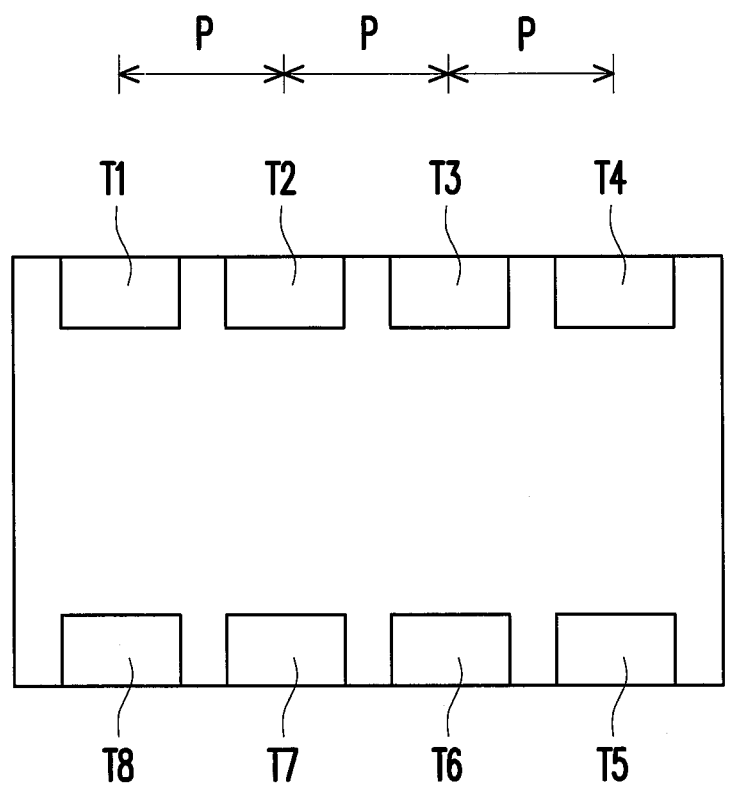

FIG. 16A to FIG. 16C are schematic views of yet another decoupling device having a multi-terminal structure according to an embodiment of the disclosure, in which, FIG. 16A is a schematic view of a lead frame of the decoupling device, FIG. 16B is a schematic view that a plurality of capacitor elements on the same plane is arrayed on the lead frame, and FIG. 16C is a schematic view of the decoupling device observed from the bottom surface.

The structure of this decoupling device 109a can be understood by referring to FIG. 16A to FIG. 16C. As shown in FIG. 16A, a lead frame 110 includes a cathode terminal portion 112 and at least two opposite anode terminal portions 114a and 114b disposed at two ends of the cathode terminal portion 112. The two anode terminal portions 114a and 114b are electrically connected with each other through a conductive line 116. It should be noted that, the cathode terminal portion 112 and the two anode terminal portions 114a and 114b can form eight terminal structures T1 to T8, and an insulating layer 130 is utilized between two terminal structures to enable the cathode terminal portion 112 and the anode terminal portions 114a and 114b to be electrically insulated from each other.

As shown in FIG. 16B, the plurality of capacitor elements 120 on the same plane is arrayed into a capacitor unit assembly in a manner of one group including 4 pieces, so as to form the decoupling device 109a having the eight terminal structures T1 to T8. More specifically, in the embodiment of FIG. 16A to FIG. 16C, the cathode terminal portion 112 and the anode terminal portions 114a and 114b include the eight terminal structures T1 to T8, the terminal structures T1 to T8 are arrayed adjacent to each other, and anode portions 124 and cathode portions 122 of adjacent capacitor elements 120 are arrayed alternately.

As shown in FIG. 16C, the number of terminal structures T1 to T8 is increased, so the current transmission path P between two adjacent terminal structures can be shortened, and the ESL can be reduced.

Figure 17A:
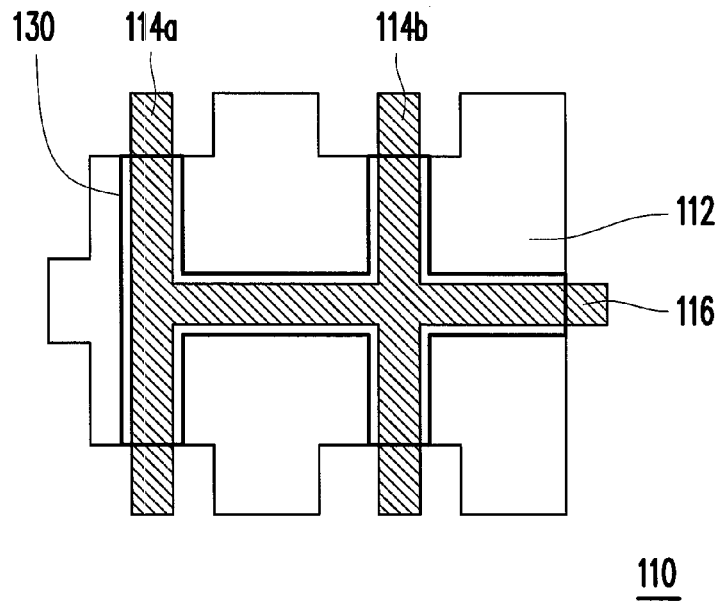
Figure 17B:
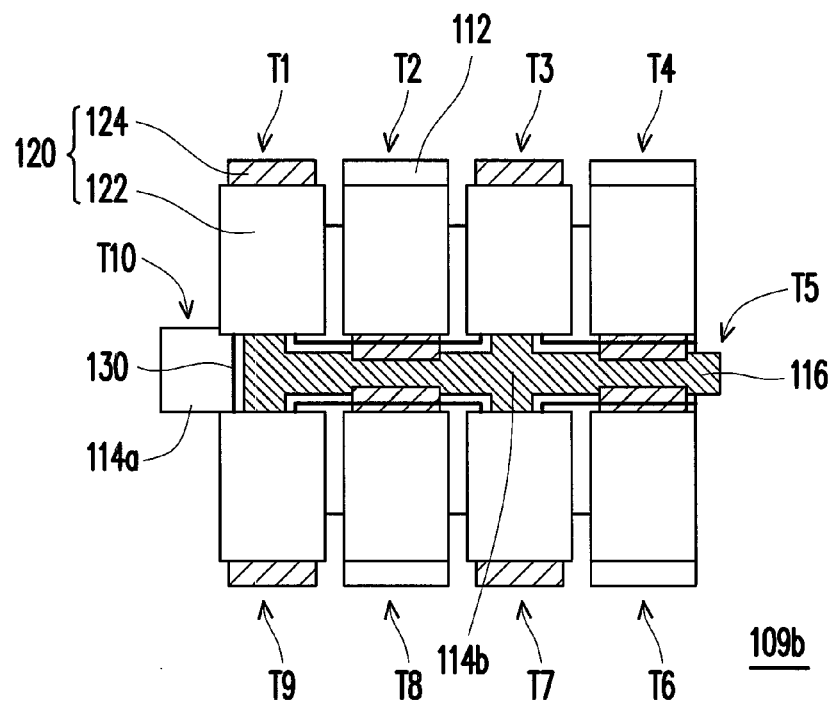
Figure 17C:
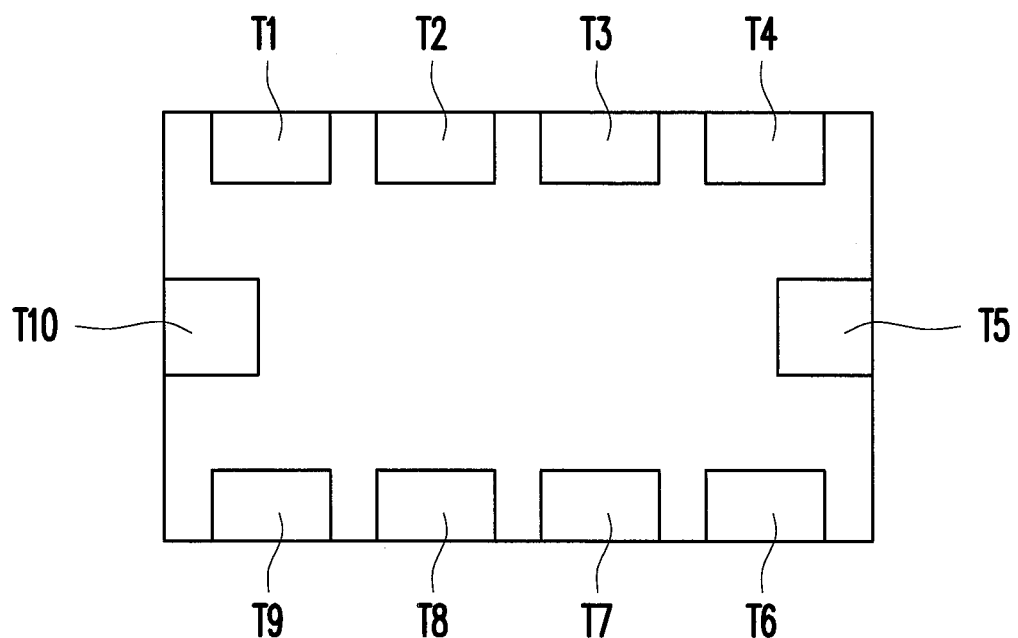

FIG. 17A to FIG. 17C are schematic views of still another decoupling device having a multi-terminal structure according to an embodiment of the disclosure, in which, FIG. 17A is a schematic view of a lead frame of the decoupling device, FIG. 17B is a schematic view that a plurality of capacitor elements on the same plane is arrayed on the lead frame, and FIG. 17C is a schematic view of the decoupling device observed from the bottom surface.

The decoupling device 109b in FIG. 17A to FIG. 17C is similar to the decoupling devices 109a in FIG. 16A to FIG. 16C, and the same device is labelled with the same symbol. It should be noted that, in FIG. 17A to FIG. 17C, ten terminal structures T1 to T10 are formed in a manner of arraying a lead frame 110 and a plurality of capacitor elements 120. The number of terminal structures T1 to T10 is further increased, so the current transmission path P between two adjacent terminal structures can be further shortened, and the ESL can be preferably reduced.

Figure 18:
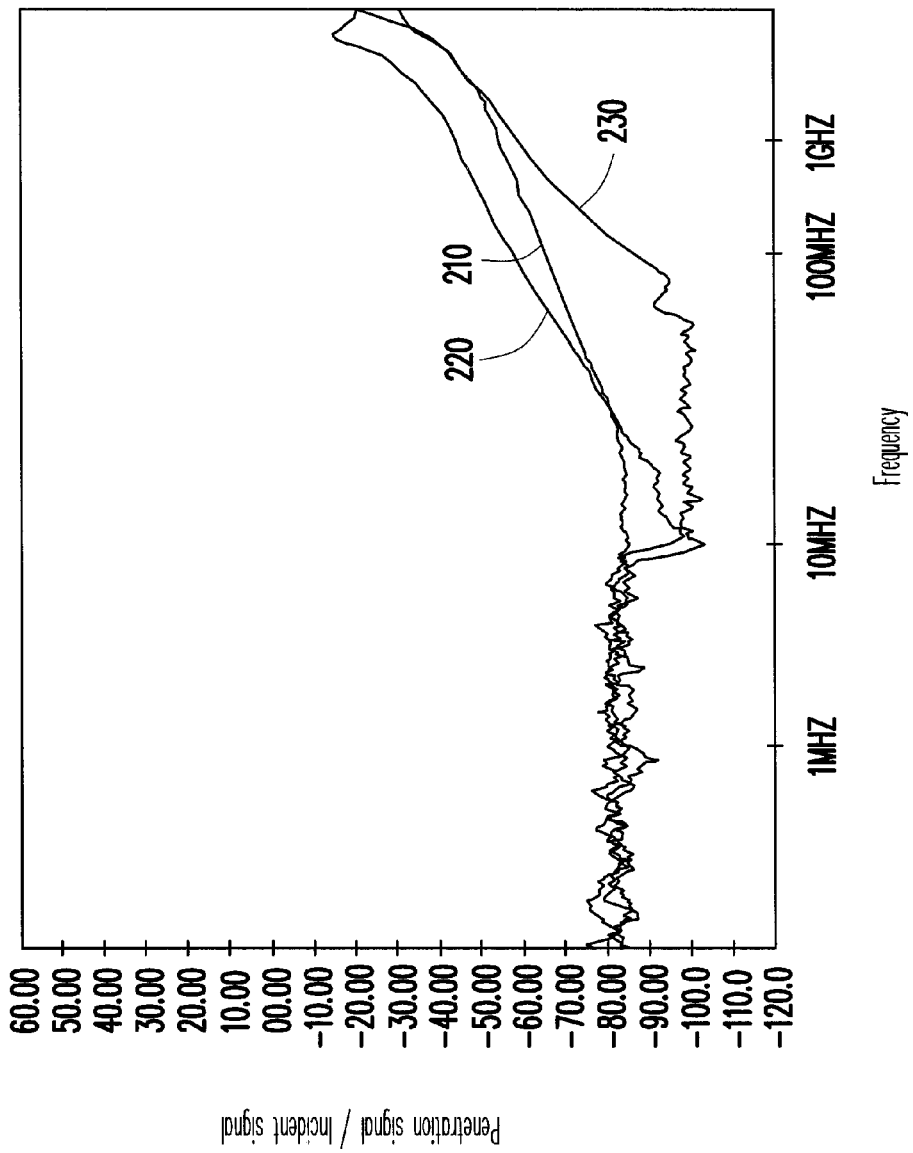
FIG. 18 is a curve comparison diagram of filtering performances of a decoupling device according to an embodiment of the disclosure and two commercially available decoupling devices.

FIG. 18 is a curve comparison diagram of filtering performances of a decoupling device according to an embodiment of the disclosure and two commercially available decoupling devices.

In the decoupling device according to the embodiment of the disclosure, capacitor elements 120 with four pieces as one group are arrayed on the same plane (the arrayed manner as shown in FIG. 3) and are stacked into four layers, and the ESR of this decoupling device is 1 mΩ at 100 KHz, which is represented with a curve 230. A conventional through type decoupling device is represented with a curve 210. A conventional alternately stacked type decoupling device is represented with a curve 220. In FIG. 18, the vertical axis is a ratio of a transmitted signal/an incident signal; the horizontal axis is the operation frequency of the decoupling devices.

Referring to FIG. 18, it can be seen that, when the through type decoupling device (the curve 210) is at a high frequency (more than 100 MHz), the filtering performance apparently deteriorates (the curve 210 is increased upward); however, the decoupling device (the curve 230) according to the embodiment of the disclosure still has an excellent filtering performance (the curve 210 is decreased downward) at a high frequency (100 MHz); that is, compared with the ratio of the through type decoupling device, at a high frequency (more than 100 MHz), the ratio (the transmitted signal/the incident signal) of the decoupling device according to the embodiment of the disclosure is lower.

Additionally, by comparing the filtering performance of the decoupling device (the curve 230) according to the embodiment of the disclosure with that of the alternately stacked type decoupling device (the curve 220) at a high frequency (more than 100 MHz), it can also be apparently seen that, the filtering performance of the decoupling device (the curve 230) according to the embodiment of the disclosure is better.

In view of the foregoing description, the decoupling device according to the disclosure at least has the following advantages.

The decoupling device adopts a manner that the plurality of capacitor elements are arrayed on the same plane and connected with each other in parallel, so as to stack the capacitor elements on the lead frame. This stacking manner is rather simple, and can effectively reduce the ESR. Additionally, the decoupling device can form the multi-terminal structure by designing the arraying manner of the lead frame and the capacitor elements, and in this way, the current transmission path between the plurality of terminals can be shortened, so as to reduce the ESL. Furthermore, the transmission line structure formed between two anode portions of the decoupling device can be utilized. This transmission line structure can generate an inductor during the operation at a high frequency, and the inductor and capacitors form an equivalent filtering circuit, so as to further enable the decoupling device to have the filtering efficacy.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A decoupling device, comprising:
a lead frame, comprising: a cathode terminal portion and at least two opposite anode terminal portions disposed at two ends of the cathode terminal portion, wherein the two anode terminal portions are electrically connected with each other through a conductive line, and the lead frame has a first horizontal plane, the cathode terminal portion comprises a spacing, and the conductive line is disposed in the spacing;
an insulating layer, disposed above the conductive line, wherein the insulating layer enables the cathode terminal portion and the anode terminal portions to be electrically insulated from each other;
at least one capacitor unit assembly, comprising a plurality of capacitor elements in a manner of N pieces as one group along a second horizontal plane which is parallel with the first horizontal plane and is electrically connected with each other in parallel, wherein N is equal to 4, the capacitor elements with N pieces are arrayed in a two by two manner on the same plane and are disposed on the lead frame, and each of the capacitor elements comprises a cathode portion and an anode portion opposite to each other;
cathode portions of the capacitor elements almost cover all area of the cathode terminal portion and are disposed on the insulating layer, and the cathode portions of the capacitor elements are electrically connected with the cathode terminal portion,
anode portions of the capacitor elements are disposed on the anode terminal portion, and the anode portions of the capacitor elements are electrically connected with the anode terminal portion in parallel.

2. The decoupling device according to claim 1, wherein multiple capacitor unit assemblies exist, the capacitor unit assemblies are arrayed in a stacked manner, and the anode portions of the capacitor elements that are vertically stacked extend in a same direction, wherein the respective cathode portions are adjacent to each other, while the respective anode portions are far away from each other.

3. The decoupling device according to claim 1, further comprising: a plurality of conductive spacers, located between the anode portions of the capacitor elements of the capacitor units assembly stacked with each other.

4. The decoupling device according to claim 1, wherein the conductive line is a consecutive bending structure.

5. The decoupling device according to claim 1, further comprising: a device with inductance characteristics, connected with the conductive line in series or in parallel.

6. The decoupling device according to claim 1, wherein the cathode terminal portion further comprises: a rough structure, located at a surface of the cathode terminal portion.

7. The decoupling device according to claim 1, further comprising: a packaging resin, partially wrapping the capacitor elements and the lead frame and exposing bottom surfaces of the cathode terminal portion and the anode terminal portions.

8. The decoupling device according to claim 7, wherein the cathode terminal portion and the anode terminal portions further each comprise: an engaging structure, disposed at an edge of the cathode terminal portion and edges of the anode terminal portions, and engaged in the packaging resin.

9. The decoupling device according to claim 7, wherein the packaging resin completely wraps the conductive line, or exposes part of the conductive line.

10. The decoupling device according to claim 1, further comprising: a first lid body and a second lid body opposite to each other, wherein the first lid body and the second lid body wrap the capacitor elements, and the first lid body exposes bottom surfaces of the cathode terminal portion and the anode terminal portions.

11. The decoupling device according to claim 10, wherein the cathode terminal portion and the anode terminal portions further each comprise: an engaging structure, disposed at an edge of the cathode terminal portion and edges of the anode terminal portions, and engaged in the first lid body.

12. The decoupling device according to claim 1, further comprising: at least one ceramic capacitor, connected between the cathode terminal portion and the anode terminal portions in parallel.

13. The decoupling device according to claim 1, further comprising: an anti-electromagnetic wave layer, covering the capacitor elements at the above of the capacitor elements.

14. The decoupling device according to claim 13, wherein the anti-electromagnetic wave layer is electrically connected with the capacitor elements.

15. The decoupling device according to claim 1, wherein each of the capacitor elements comprises:

a valve metal layer;

a dielectric layer, formed on the valve metal layer;

a conductive polymer layer, formed on the dielectric layer; and a cathode conductive layer, formed on the conductive polymer layer.

16. The decoupling device according to claim 15, wherein each of the capacitor elements is a capacitor element with a tantalum capacitor, the valve metal layer is made of tantalum metal, the dielectric layer is made of a tantalum oxide, the cathode conductive layer is made of a carbon paste-silver paste mixture, and the anode portion at least comprises an extending conductive line electrically connected with the anode terminal portion.

17. The decoupling device according to claim 1, wherein the capacitor elements are arrayed in a set direction, the anode portions of the two adjacent capacitor elements are staggered with each other in a predetermined spacer number D, and D is larger than or equal to 1.

\* \* \* \* \*